United States Patent [19]

Ito

[11] 4,158,531

[45] Jun. 19, 1979

[54] ROTARY ENGINE WITH AN OSCILLATION DAMPING LAYER

[75] Inventor: Ryozo Ito, Toyota, Japan

[73] Assignee: Toyota Jidosha Kogyo Kabushiki Kaisha, Japan

[21] Appl. No.: 782,312

[22] Filed: Mar. 29, 1977

[30] Foreign Application Priority Data

Jul. 2, 1976 [JP] Japan .................................. 51-79332

[51] Int. Cl.² .......................... F01C 21/06; F02F 1/10
[52] U.S. Cl. ..................................... 418/83; 123/41.71
[58] Field of Search ................. 418/83, 152, 153, 156, 418/178; 123/41.5, 41.71, 41.79, 41.55, 198 E, 195 C

[56] References Cited

U.S. PATENT DOCUMENTS

| | | | |
|---|---|---|---|
| 679,367 | 7/1901 | Darling | 123/41.71 |
| 1,616,941 | 2/1927 | Woolson | 123/41.71 |
| 2,881,751 | 4/1959 | Bodine | 123/191 B |
| 3,134,537 | 5/1964 | Bentele et al. | 418/83 |
| 3,882,842 | 5/1975 | Bailey et al. | 123/193 C |
| 3,996,913 | 12/1976 | Hamparian | 123/198 R |

FOREIGN PATENT DOCUMENTS

2205548 8/1973 Fed. Rep. of Germany ............. 418/83

*Primary Examiner*—William L. Freeh
*Assistant Examiner*—Leonard E. Smith
*Attorney, Agent, or Firm*—Stevens, Davis, Miller & Mosher

[57] ABSTRACT

A Wankel type rotary engine comprising a rotor housing composed of an inner wall portion defining a trochoidal inner peripheral surface, an outer wall portion, enclosing said inner wall portion and stay portions interconnecting the inner and outer wall portions, while a cooling water passage is defined between the inner and outer wall portions, wherein an oscillation damping layer is provided on at least a part of the surface of the inner wall portion which faces the cooling water passage.

2 Claims, 2 Drawing Figures

ROTARY ENGINE WITH AN OSCILLATION DAMPING LAYER

BACKGROUND OF THE INVENTION

1. Field of the Invention

The present invention relates to a rotary engine and, more particularly, an improvement thereof which avoids the generation of chatter marks in the trochoidal inner peripheral surface of the rotor housing due to a resonance of the apex seals mounted at apex portions of the rotor and the rotor housing.

2. Description of the Prior Art

In the Wankel type rotary engine which generally comprises a casing composed of a rotor housing having a trochoidal inner peripheral surface and side housings which close the opposite ends of said rotor housing, an eccentric shaft and a polygonal rotor adapted to eccentrically rotate around said eccentric shaft with apex portions thereof sliding over said trochoidal inner peripheral surface, chatter marks are generated in said trochoidal inner peripheral surface, due to a resonance of the apex seals provided at said apex portions of the rotor and the rotor housing. In a rotary engine of the aforementioned type, the rotor housing generally includes an inner wall portion, which provides said trochoidal inner peripheral surface, and an outer wall portion, which encloses said inner wall portion therein so that a cooling water passage is defined therebetween, and through which cooling water is circulated during the operation of the engine. The inner and outer wall portions are generally formed as an integral member together with a plurality of stay portions which bridge and connect the two wall portions, while said cooling water passage is defined to be separate individual passages defined by the inner and outer wall portions and two adjacent stay portions. The inner wall portion is generally formed as a relatively thin wall structure, supported by the outer wall portion by means of the stay portions arranged and spaced therealong and, because of this, when the individual apex portions or apex seals of the rotor successively traverse over individual portions of the inner wall portion, thereby exerting a kind of oscillating force thereto, the inner wall portion supported by the spaced stay portions is caused to oscillate. If the oscillation of a particular portion of the inner wall portion resonates with the oscillating force applied thereto, the inner surface of the particular portion is subject to a strong rubbing action applied by the apex seals, thereby causing a heavy local wearing action generating a chatter mark defined by a series of worn portions.

SUMMARY OF THE INVENTION

It is the object of the present invention to deal with the aforementioned problem and to provide an improved rotary engine with a simple oscillation damping structure in the inner wall portion of the rotor housing.

In accordance with the present invention, the above-mentioned object is accomplished by a rotary engine of the aforementioned basic structure, wherein the improvement comprises an oscillation damping layer means provided on at least a part of the surface of said inner wall portion which faces said cooling water passage.

By providing an oscillation damping layer means such as a layer of rubber, plastic or the like on at least a part of the outer surface of said inner wall portion facing the cooling water passage, particularly a part where a chatter mark is prone to be generated, the oscillation of the inner wall portion is dampened, thereby effectively suppressing the generation of chatter marks due to the oscillation of the inner wall portion. Various kinds of rubber material such as fluorated rubber, silicone rubber or the like, and various kinds of plastic materials can be used for the oscillation damping layer. Furthermore, in some cases a ceramic material will also be usable. The oscillation damping layer may be attached to the outer surface of the inner wall portion facing the cooling water passage by baking or by a proper adhesive. The oscillation damping layer absorbs the oscillation energy of the inner wall portion within itself, where the energy is converted into heat. In addition, or alternatively, the oscillation energy is absorbed by the friction effected between the damping layer and the rotor housing and, it is also converted into heat in the friction surface.

The oscillation damping layer provided on the surface of the inner wall portion facing the cooling water passage forms an impedance layer with regard to the heat flow from the inner wall portion to the cooling water flowing through the cooling water passage thereby causing an increase in the temperature of the inner wall portion of the rotor housing. However, the critical factor which controls an overheating burn-out of the rotor housing is generally the heat transmission between the wall of the cooling water passage and the cooling water. If the overheating grows beyond a limit where the boiling heat transfer rate is the maximum, the temperature of the wall of the cooling water passage or the outer wall of the inner wall portion of the rotor housing rises abruptly and is burnt out. The provision of the oscillation damping layer on the outer surface of the inner wall portion does not cause any substantial rise of the temperature of the inner wall portion and does not have any substantial effect on the danger of an overheating burn-out of the rotor housing. Rather on the contary, the oscillation damping layer provides an advantage that the temperature of the trochoidal inner peripheral surface is somewhat raised, but still within the burn-out limit, whereby the fuel consumption of the engine is improved.

BRIEF DESCRIPTION OF THE DRAWING

In the accompany drawing.

DESCRIPTION OF THE PREFERRED EMBODIMENT

Figure 1:
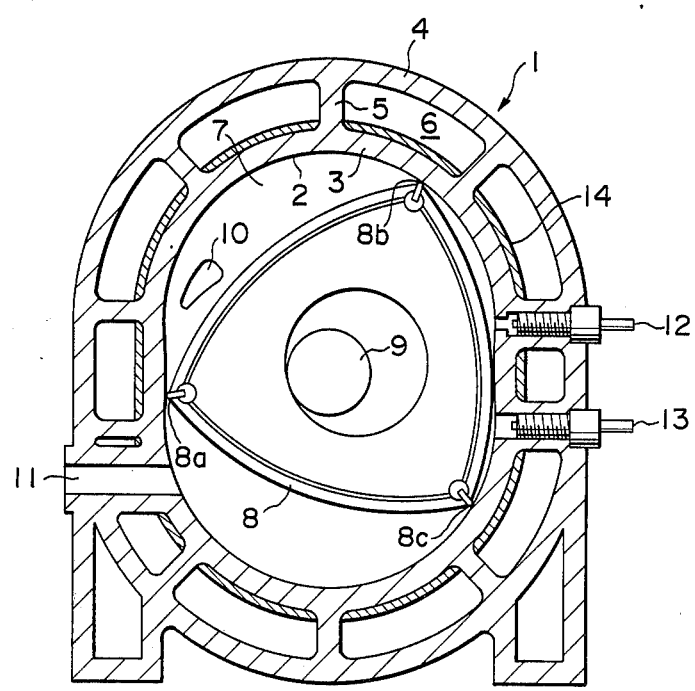
FIG. 1 is a diagrammatical sectional view showing an embodiment of the rotary engine of the present invention; and, FIG. 2 is a diagram showing the manner of temperature drop which occurs across the inner wall portion of the rotor housing in the structure shown in FIG. 1.

In the following the invention will be described with regard to an embodiment with reference to the accompanying drawing. Referring to FIG. 1, 1 designates a rotor housing formed as an integral structure including an inner wall portion 3 which defines a trochoidal inner peripheral surface 2, an outer wall portion 4 which encloses said inner wall portion and a number of stay portions 5 inter-connecting said inner and outer wall portions while cooling water passages 6 are defined in the rotor housing. The opposite open ends of the rotor housing are closed by side housings, one of which is designated by 7, thus forming an engine casing. In the casing is mounted a polygonal rotor 8 to eccentrically rotate around an eccentric shaft 9 while apex seals 8a, 8b and 8c provided at apex portions of the rotor slide over the trochoidal inner peripheral surface 2. 10 designates an intake port formed at a side port and 11 designates an exhaust port formed as a peripheral port. 12 and 13 designate spark plugs.

In accordance with the present invention, an oscillation damping layer 14 is provided on the outer surface of the inner wall portion 3 which faces the cooling water passages 6. As described above, the oscillation damping layer may be made of a proper damping mater such as fluorinated rubber, silicone rubber plastics, ceramics etc., and the layer may be attached to said outer surface by the art of baking or by employing a suitable adhesive.

Figure 2:
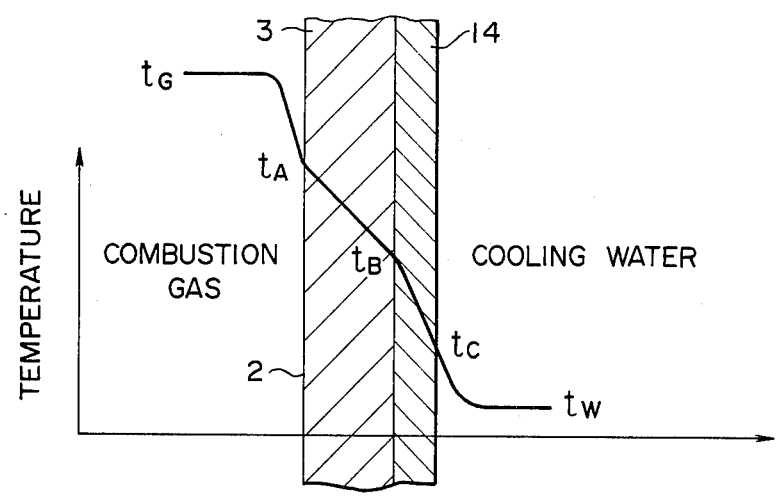

FIG. 2 shows the manner of temperature drop which occurs across the inner wall portion of the rotor housing when it incorporates the oscillation damping layer. In the FIG. 2, $t_G$ is the gas temperature in the combustion chamber and $t_A$ is the temperature of the trochoidal inner peripheral surface 2. $t_A$ is lower than $t_G$ by a temperature drop caused in the boundary layer. The inner wall portion 3 is generally made of a metal having a relatively high heat conductivity such as aluminium alloys and, therefore, across the inner wall portion the temperature drops from $t_A$ to $t_B$ with a relatively small temperature gradient. Then, due to the oscillation damping layer 14 therein mounted, the temperature drops further from $t_B$ to $t_C$ across the layer and, finally, depending upon the heat transfer effected between the surface of the layer 14 and the cooling water flowing through the cooling water passages 6, the temperature drops from $t_C$ to $t_W$. Of course, it will be noted that $t_G$ and $t_W$ are the initial conditions given by the combustion gases and the cooling water and, depending upon the initial conditions, the intermediate temperatures $t_A$, $t_B$ and $t_C$ are determined. As explained above, the danger of causing an overheating burn-out of the rotor housing is encountered when the difference between the temperature at the wall surface of the cooling water passage and that of the cooling water, i.e. the difference between $t_C$ and $t_W$ in the case of FIG. 2 has exceeded a limit which effects the maximum boiling heat transfer, whereby the temperature $t_C$ rises extradordinarily thereby causing an extraordinary rise in the temperature $t_A$-$t_B$. Unless such an extraordinary temperature difference is caused, the additional temperature difference $\Delta t = t_B - t_C$ incorporated in the temperature drop performance by the provision of the oscillation damping layer 14 does not cause any extraordinary rise in temperature $t_A$ of the trochoidal inner peripheral surface 2. Rather on the contary, a small temperature rise effected for $t_A$ improves the heat insulation for the combustion chamber, and contributes to an improvement in the fuel consumption.

Thus, it will be appreciated that the simple modification proposed by the present invention, which is to provide an oscillation damping layer on at least a part of the surface of the inner wall portion of the rotor housing which faces the cooling water passages provides not only the advantages of suppressing the oscillation of the inner wall portion so as to avoid the generation of chatter marks in the trochoidal inner peripheral surface, but also an additional advantage, in that the fuel consumption of the engine is improved.

Although it has been described that the oscillation damping layer is to be provided on at least a part of the surface of the inner wall portion of the rotor housing which faces the cooling water passage, the layer may of course be provided on the entire region of said surface and, furthermore, it may also be provided on a similar surface of the side housing, if required.

Although the invention has been shown and described with respect to a preferred embodiment thereof, it should be understood by those skilled in the art that various changes and omissions of the form and detail thereof may be made therein without departing from the scope of the invention.

I claim:

1. A rotary engine comprising a casing composed of a rotor housing having a trochoidal inner peripheral surface and side housings which close the opposite ends of said rotor housing, an eccentric shaft and a polygonal rotor adapted to eccentrically rotate around said eccentric shaft with apex portions sliding over said trochoidal inner peripheral surface, said rotor housing including an inner wall portion which provides said trochoidal inner peripheral surface and an outer wall portion which encloses said inner wall portion therein while a cooling water passage is defined therebetween, wherein the improvement comprises an oscillation damping layer means made of fluorinated rubber provided on at least a part of the surface of said inner wall portion which faces said cooling water passage, said layer means having a substantially greater thickness than a mere surface coating layer so as to have a substantial kinetic energy absorbing capacity.

2. A rotary engine comprising a casing composed of a rotor housing having a trochoidal inner peripheral surface and said housings which close the opposite ends of said rotor housing, an eccentric shaft and a polygonal rotor adapted to eccentrically rotate around said eccentric shaft with apex portions sliding over said trochoidal inner peripheral surface, said rotor housing including an inner wall portion which provides said trochoidal inner peripheral surface and an outer wall portion which encloses said inner wall portion therein while a cooling water passage is defined therebetween, wherein the improvement comprises an oscillation damping layer means made of silicone rubber provided on at least a part of the surface of said inner wall portion which faces said cooling water passage, said layer means having a substantially greater thickness than a mere surface coating layer so as to have a substantial kinetic energy absorbing capacity.

* * * * *